United States Patent [19]

Amos

[11] Patent Number: 4,811,512

[45] Date of Patent: Mar. 14, 1989

[54] FISHERMAN'S ALERTING APPARATUS

[76] Inventor: Robert O. Amos, 3215 Baird Ave., Lakeland, Fla. 33805

[21] Appl. No.: 28,916

[22] Filed: Mar. 23, 1987

[51] Int. Cl.$^4$ ............................................. A01K 97/12
[52] U.S. Cl. ........................................................ 43/17
[58] Field of Search ........................................ 43/17, 16

[56]  References Cited
U.S. PATENT DOCUMENTS

| | | | |
|---|---|---|---|
| 1,847,798 | 3/1932 | Wark | 43/17 |
| 2,867,054 | 1/1959 | Okimoto | 43/17 |
| 3,020,664 | 2/1962 | Snyder | 43/17 |
| 3,024,561 | 3/1962 | Wyatt | 43/17 |
| 3,559,327 | 2/1971 | Christopher | 43/17 |
| 3,798,630 | 3/1974 | Crosthwait | 43/17 |
| 3,835,568 | 9/1974 | Whitfield | 43/17 |
| 4,479,322 | 10/1984 | Koppel | 43/21.2 |
| 4,523,403 | 6/1985 | Ivy | 43/17 |

Primary Examiner—Gene P. Crosby
Attorney, Agent, or Firm—Norman B. Rainer

[57] ABSTRACT

Apparatus is provided for audibly alerting a fisherman of a bite on a fishing line associated with one or more unattended rod and reel assemblies. The apparatus utilizes an elongated horizontal member having several notches in its uppermost edge. The horizontal member is attached to the resilient contact arm of an on-off switch attached to the upper extremity of an upright support member. The fishing lines are disposed in the notches in the horizontal member in perpendicular disposition thereto. When a fish bites, the horizontal member is pulled forward, causing the switch to go to the on position which activates an alarm device.

4 Claims, 2 Drawing Sheets

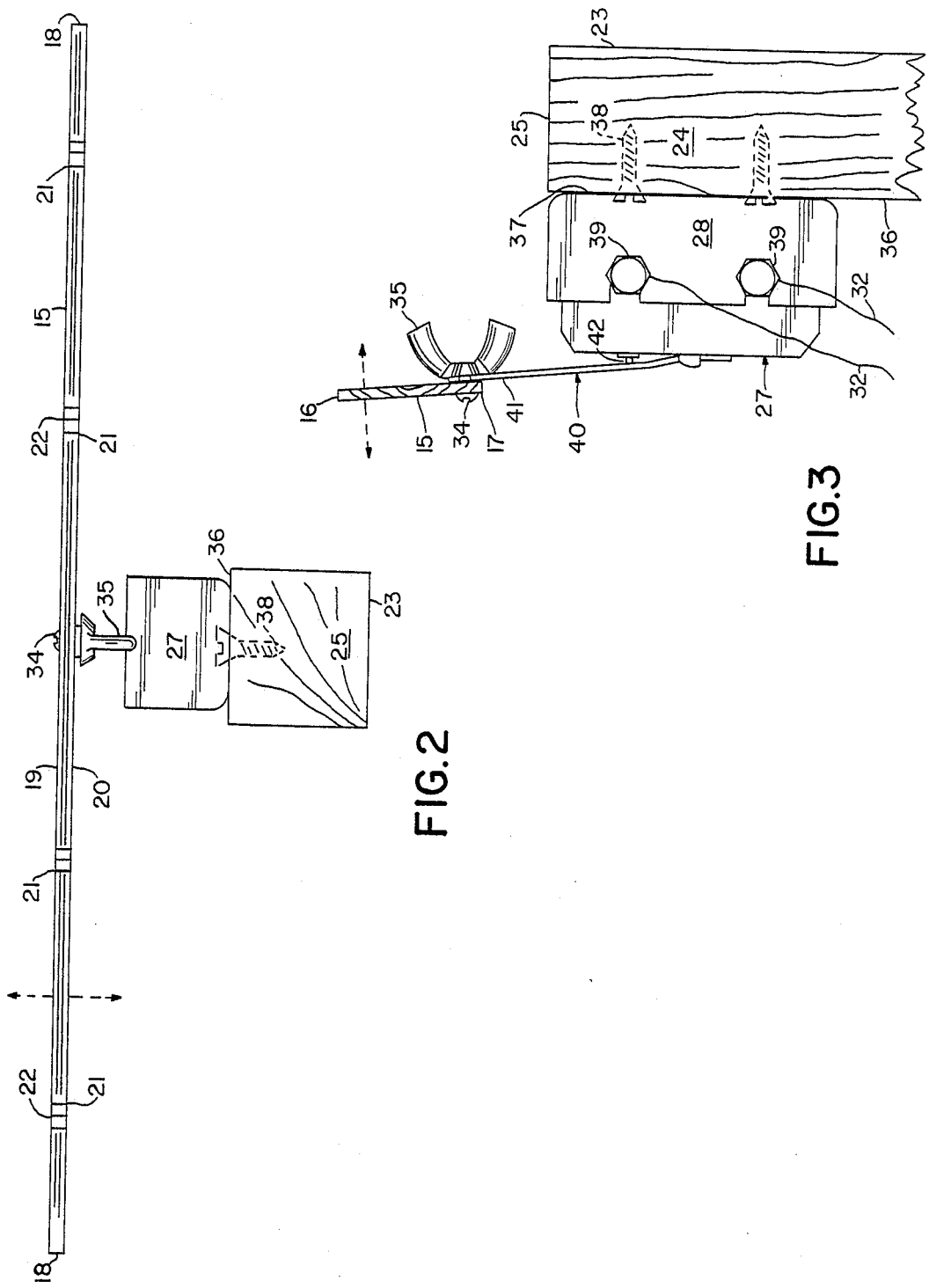

FISHERMAN'S ALERTING APPARATUS

BACKGROUND OF THE INVENTION

This invention relates to sport fishing, and more particularly concerns apparatus for alerting a fisherman when a fish strikes at the line of his unattended fishing rod and reel assembly.

As the leisure time of people has increased, fishing, as a sport has become more popular. However, many fisherman do not like to constantly hold their fishing rod and reel assemblies, but instead, would rather secure such assemblies in place while they engage in other activities sometimes remote from the fishing site.

Various alarms have been devised in the past to signal a bite on fishing tackle. However, such prior art alarms have all had various shortcomings which thwarted their widespread acceptance. Among these are switch devices, actuated by movement of the rod, reel or line but which, when the time comes to fight or reel in the fish, become a nuisance or hindrance. Additionally, such devices have generally been limited to use with a single rod and reel assembly and designed to provide an effective alerting signal only in close proximity to the rod and reel assembly. Other earlier alarm devices have required auxiliary support structure found only on a boat or pier, or have been difficult to operate, or expensive, or of a size too large for convenient transportation to the fishing site, or prone to causing weakening damage to the fishing line.

It is accordingly an object of the present invention to provide alerting apparatus capable of accommodating more thanone rod and reel assembly and providing no impediment to the reeling-in of the fish.

It is another object of this invention to provide apparatus as in the foregoing object amenable to easy operation upon a shoreline fishing site and capable of producing an effective alerting signal remote from said site.

It is a further object of the present invention to provide apparatus of the aforesaid nature of compact size and amenable to low cost manufacture.

These objects and other objects and advantages of the invention will be apparent from the following description.

SUMMARY OF THE INVENTION

The above and other beneficial objects and advantages are accomplished in accordance with the present invention by an apparatus for alerting a fisherman of a bite on a fishing line associated with one or more unattended rod and reel assemblies, said apparatus comprising:

(a) a rigid elongated horizontal member, having upper and lower edges, opposed end extremities, front and rear surfaces, and several parallel straight notches recessed into said upper edge in perpendicular disposition to said front and rear surfaces and symmetrically disposed about the midpoint of the horizontal member with respect to said end extremities, (b) a straight rigid support member having a pointed lower extremity capable of being forced into the ground to dispose the support membert in an upright orientation, forward and rear surfaces, and an upper extremity, the length of said support member, measured between said upper and lower extremities, being greater than the length of the horizontal member, (c) electrical on-off switch means attached to said support member adjacent said upper extremity and having a resilient metal contact arm that extends vertically above said upper extremity to a distal end which releasably attaches to the midpoint of the horizontal member, and thereby positions said horizontal member perpendicularly to said support member in T configuration while permitting movement of said horizontal member in the direction between forward and rear surfaces of the support member, (d) electrically driven audible signal means, (e) a battery power source, and (f) electrical circuitry which causes the battery to energize the audible signal means when said switch is in the on position, whreeby (g) fishing lines tautly held by said notches cause forward movement of the horizontal member when a fish bites on the line, said movement placing the switch means in its on positions which activates the audible signal means.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 2 is an enlarged fragmentary top view of the embodiment of FIG. 1.

FIG. 3 is an enlarged fragmentary side view of the embodiment of FIG. 1.

Figure 1:
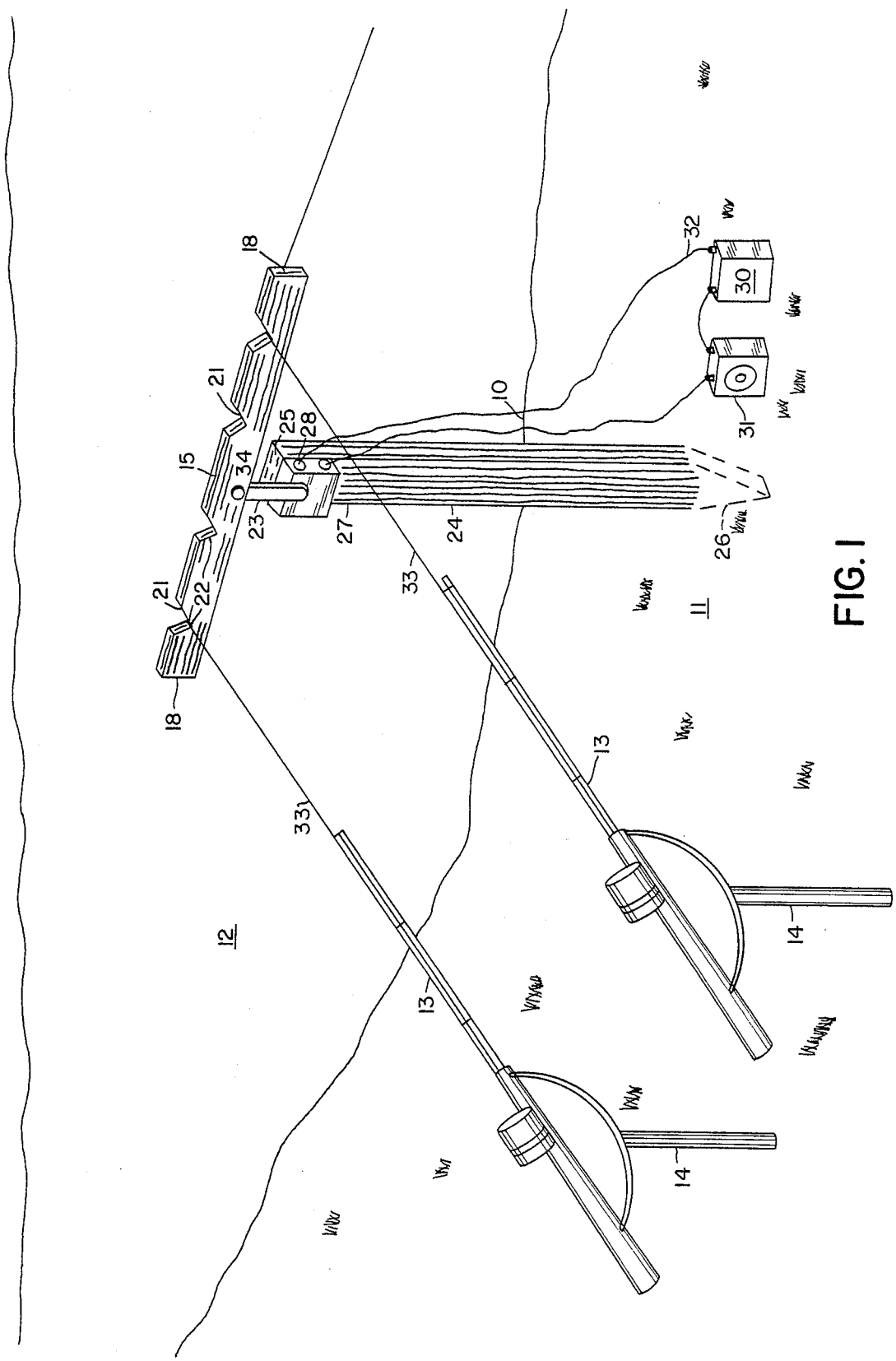
FIG. 1 is a perspective view of an embodiment of the apparatus of this invention shown in operative association with two unattended rod and reel assemblies.

For convenience in description, the expressions "front" or "rear", and terms of similar import will have reference to the right and left extremities, respectively, of the apparatus as shown in FIG. 3.

DESCRIPTION OF THE PREFERRED EMBODIMENT

Referring to FIGS. 1–3, an embodiment 10 of the alerting apparatus of the present invention is shown positioned upon a beach 11 adjacent a body of water 12. Also positioned upon the beach are two rod and reel assemblies 13, each being secured by a holder device 14 of conventional design.

The alerting apparatus is comprised of a straight rigid elongated horizontal member 15 having parallel upper andlower edges 16 and 17, respectively, opposed end extremities 18, and vertically disposed parallel front and rear surfaces 19 and 20, respectively. Four V-shaped notches 21 are recessed into said upper edges in symmetrical disposition about a midpoint site on the horizontal member equidistantly spaced from extremities 18. The bottom 22 of each notch 21 has a straight line configuration perpendicularly disposed to said front and rear surfaces. The several notch bottoms 22 are inparallel alignment.

Straight rigid support post 24 has a forward surface 23, rear surface 36, upper extremity 25, and a pointed lower extremity 26 adapted to be forced into the beach sand or other terrain to dispose the support member in a substantially vertical orientation. The length of the support member, measured between said upper and lower extremities, is greater than the length of the horizontal member. The support member may be fabricated of several components capable of being dismantled to a compact storage state.

An electrical on-off switch assembly 27 is affixed to rear surface 36 of support post 24 adjacent the upper extremity thereof. Switch assembly 27 is comprised of a housing 28 having a flat base 37 provided with apertures that permit penetration of screws 38 for attachment to support post 24. Connection terminals 39 located on one side of the housing permit releasable attachment of electrical lead wires. A resilient metal contact arm 40 is attached to the switch assembly opposite base 37, and extends upwardly to a distal extremity 41 having an aperture which accommodates bolt 34. The contact arm is rearwardly biased and capable of movement in a direction between the forward and rear surfaces of support post 24, as shown by the arrowed lines in FIGS. 2 and 3. Horizontal member 15 is attached at its midpoint to the distal extremity of contact arm 40 by means of bolt 34 and interactive wing nut 35. Means may be provided to prevent swiveling of the horizontal member about bolt 34. When in its forward-most position, the contact arm touches contact point 42, thereby completing an electrical series circuit involving a source of current such as battery 30, and a sound-producing device 31 which may be a buzzer or bell having an associated loudspeaker. Lead wires 32 extend between the several electrical components to complete the circuit.

In operation, the fishing line 33 from each rod and reel assembly, after having been cast out into the water, is entered into one of the notches 21. When a fish bites on the bait disposed at the end of the fishing line, sufficient force is generated to pull the horizontal member forward, thereby activating the audible alarm in the aforesaid manner. In certain situations the sensitivity of the apparatus may be dependent upon the angle which the fishing line makes as it passes over horizontal member 15. The sensitivity of the apparatus is also dependent upon the drag adjustment of the fishing reel.

Because the horizontal member can be readily disengaged from the contact arm, the entire apparatus can be made to occupy very little storage space in the disassembled state. When it is desired to hear the alarm at a far distance from the fishing site, a long electrical lead wire may be utilized to position the sound-producing component closer to the fisherman.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A apparatus for alerting a fisherman of a bite on a fishing line associated with one or more unattended rod and reel assemblies, said apparatus comprising:
    (a) a rigid elongated horizontal member having upper and lower edges, opposed end extremities, front and rear surfaces, and several parallel straight notches recessed into said upper edge in perpendicular disposition to said front and rear surfaces and symmetrically disposed about the midpoint of the horizontal member with respect to said end extremities.
    (b) a straight rigid support member having a pointed lower extremity capable of being forced into the ground to dispose the support member in an upright orientation, forward and rear surfaces, and an upper extremity, the length of said support member, measured between said upper and lower extremities, being greater than the length of the horizontal member,
    (c) electrical on-off switch means attached to said support member adjacent said upper extremity and having a resilient metal contact arm that extends vertically above said upper extremity to a distal end which releasibly attaches to the midpoint of the horizontal member, and thereby positions said horizontal member perpendicularly to said support member in T configuration while permitting movement of said horizontal member in the direction between forward and rear surfaces of the support member,
    (d) electrically driven audible signal means,
    (e) a battery power source, and
    (f) electrical circuitry which causes the battery to energize the audible signal means when said switch is in the on position, whereby
    (g) fishing lines tautly held by said notches cause forward movement of the horizontal member when a fish bites on the line, said movement placing the switch means in its on position which activates the audible signal means.

2. The apparatus of claim 1 wherein the support member is comprised of at least two components capable of being dismantled to produce a compact storage configuration.

3. The apparatus of claim 1 wherein said on-off switch is attached to the rear surface of said support member.

4. The apparatus of claim 1 wherein the distal end of the contact arm contains an aperture through which a threaded bolt passes for engagement of said horizontal member.

* * * * *